(12) United States Patent
Tzeng

(10) Patent No.: US 6,711,165 B1
(45) Date of Patent: Mar. 23, 2004

(54) APPARATUS AND METHOD FOR STORING MIN TERMS IN NETWORK SWITCH PORT MEMORY FOR ACCESS AND COMPACTNESS

(75) Inventor: Shr-jie Tzeng, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 771 days.

(21) Appl. No.: 09/594,606

(22) Filed: Jun. 15, 2000

(51) Int. Cl.⁷ .............................................. H04L 12/28
(52) U.S. Cl. ....................... 370/392; 370/412; 370/474; 311/147; 311/153; 311/171
(58) Field of Search ................................. 370/252, 253, 370/392, 412, 474; 711/147, 153, 171; 709/230, 250

(56) References Cited

U.S. PATENT DOCUMENTS

| | | | |
|---|---|---|---|
| 5,953,335 A | | 9/1999 | Erimli et al. |
| 6,021,132 A | * | 2/2000 | Muller et al. ............... 370/412 |
| 6,389,468 B1 | * | 5/2002 | Muller et al. ............... 709/226 |
| 6,453,360 B1 | * | 9/2002 | Muller et al. ............... 709/250 |

* cited by examiner

Primary Examiner—Hassan Kizou
Assistant Examiner—Michael I. McLoughlin

(74) Attorney, Agent, or Firm—Manelli Denison & Selter PLLC; Leon R. Turkevich

(57) ABSTRACT

A network switch, configured for performing layer 2 and layer 3 switching in an Ethernet (IEEE 802.3) network without blocking of incoming data packets, includes a network switch port having a filter (i.e., a packet classifier module) configured for evaluating an incoming data packet on an instantaneous basis. The network switch includes a processor interface for receiving a plurality of templates configured for simultaneous comparison of respective data formats in an incoming data packet. Each template is composed of a plurality of min terms, wherein each min term specifies a prescribed comparison operation within a selected data byte of the incoming data packet. The templates may be programmed by a user and stored in an internal min term memory. A min term controller controls the storage of the min terms in the min term memory by determining for each min term a corresponding relevance of the corresponding selected data byte in evaluation of the incoming data packet. The min term controller stores each of the min terms in selected memory blocks of the min term memory based on the corresponding relevance to evaluation of the incoming data packet. In the event that a group of min terms exceed the capacity of a selected memory block, the excess group of min terms may be stored in a user-defined field. In the event that a group of min terms related to a byte location exceed the capacity of a selected memory block and selected user-defined field, the second excess group of min terms may be stored in a shared field.

20 Claims, 12 Drawing Sheets

APPARATUS AND METHOD FOR STORING MIN TERMS IN NETWORK SWITCH PORT MEMORY FOR ACCESS AND COMPACTNESS

FIELD OF THE INVENTION

The present invention relates to layer 2 and layer 3 switching of data packets in a non-blocking network switch configured for switching data packets between subnetworks.

BACKGROUND ART

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a non-blocking mode, where data packets can be output from the switch at the same rate that the data packets are received. Newer designs are needed to ensure that higher speed switches can provide both layer 2 switching and layer 3 switching capabilities for faster speed networks such as 100 Mbps or gigabit networks.

However, such design requirements risk loss of the non-blocking features of the network switch, as it becomes increasingly difficult for the switching fabric of a network switch to be able to perform layer 3 processing at the wire rates (i.e., the network data rate).

SUMMARY OF THE INVENTION

There is a need for an arrangement that enables a network switch to provide layer 2 switching and layer 3 switching capabilities for 100 Mbps and gigabit links without blocking of the data packets.

There is also a need for an arrangement that enables a network switch to provide layer 2 switching and layer 3 switching capabilities with minimal buffering within the network switch that may otherwise affect latency of switched data packets. There is also a need for an arrangement that enables a network switch to be easily programmable to distinguish between different types of layer 3 data packets, wherein the network switch can interact with the host processor in loading min terms, used in evaluating layer 3 data packets, into specialized memories within a network switch port.

There is also a need for an arrangement that minimizes required memory space in a network switch port by optimizing the storage of min terms, used in evaluating layer 3 data packets, for evaluation of the most relevant data bytes of the layer 3 data packets.

These and other needs are attained by the present invention, where min terms to be used in evaluating an incoming data packet are stored in a network switch port based on min term relevance to the received data bytes and memory block capacity. The method includes receiving from a host controller a plurality of templates configured for simultaneous identification of respective data formats in the incoming data packet. Each template has at least one min term configured for comparing a corresponding prescribed value to a corresponding selected byte of the incoming data packet. The method also includes allocating memory block sizes based on relevance of respective incoming data bytes of the incoming data packet to evaluation of the incoming data packet, and storing the min terms in a min term memory within the network switch port. The storing of min terms includes storing a first group of the min terms configured for simultaneous comparison with a corresponding first of the incoming data bytes in a first memory block within the min term memory, and storing a first excess group of the first group of min terms configured for simultaneous comparison with the corresponding first of the incoming data bytes in a user-defined memory block within the min term memory in response to the first group of min terms exceeding a capacity of the first memory block. The storage of templates configured for identifying respective data formats enables the network switch port to be easily programmable to identify user-defined data formats. Moreover, the storage of the relevant min terms in memory blocks over at least two allocated memory blocks enables the memory to be optimized for access and capacity to store the most relevant min terms.

Another aspect of the present invention provides for a network switch port. The network switch port includes a processor interface configured for receiving a plurality of templates configured for simultaneous identification of respective data formats in an incoming data packet. Each template has at least one min term configured for comparing a corresponding prescribed value to a corresponding selected byte in the incoming data byte. The network switch also includes a min term memory configured for storing min term values and having a plurality of memory blocks. Each min term value is stored in a selected memory block, having a corresponding size, based on at least one of a location of a corresponding selected byte of the incoming data packet for comparison and a relevance of the corresponding selected byte to evaluation of the incoming data packet. The network switch port filter also includes a min term controller configured for allocating memory block sizes in the min term memory based on relevance of respective incoming data bytes of the incoming data packet for evaluation of the incoming data packet. The min term controller stores a first group of the min terms configured for simultaneous comparison with a corresponding first of the incoming data bytes in a first memory block within the min term memory. The min term controller also stores a first excess group of the first group of min terms configured for simultaneous comparison with the corresponding first of the incoming data bytes in a user-defined memory block within the min term memory.

Hence, the storage of relevant min terms may be organized according to location of the corresponding selected byte of the selected incoming data byte, optimizing the min term memory for access and capacity.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Network Switch Port Filter Overview

Figure 1:
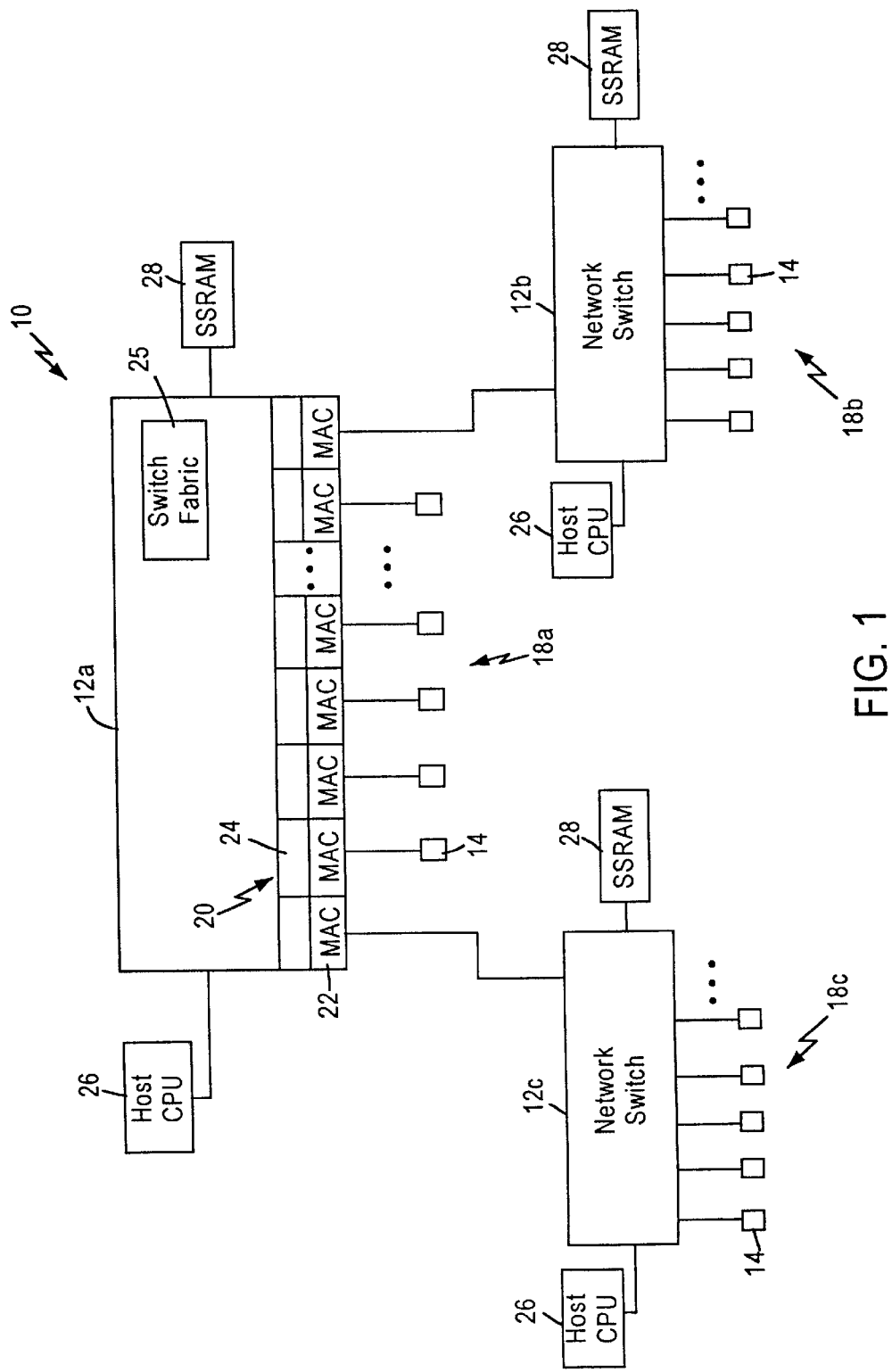
FIG. 1 is a block diagram of a packet switched network including multiple network switches for switching data packets between respective subnetworks according to an embodiment of the present invention.

FIG. 1 is a block diagram illustrating a packet switched network 10, such as an Ethernet (IEEE 802.3) network. The packet switched network includes integrated (i.e., single chip) multiport switches 12 that enable communication of data packets between network stations 14. Each network station 14, for example a client workstation, is typically configured for sending and receiving data packets at 10 Mbps or 100 Mbps according to IEEE 802.3 protocol. Each of the integrated multiport switches 12 are interconnected by gigabit Ethernet links 16, enabling transfer of data packets between subnetworks 18a, 18b, and 18c. Hence, each subnetwork includes a switch 12, and an associated group of network stations 14.

Each switch 12 includes a switch port 20 that includes a media access control (MAC) module 22 and a packet classifier module 24. The MAC module 20 transmits and receives data packets to the associated network stations 14 across 10/100 Mbps physical layer (PHY) transceivers (not shown) according to IEEE 802.3u protocol. Each switch 12 also includes a switch fabric 25 configured for making frame forwarding decisions for received data packets. In particular, the switch fabric 25 is configured for layer 2 switching decisions based on source address, destination address, and VLAN information within the Ethernet (IEEE 802.3) header; the switch fabric 25 is also configured for selective layer 3 switching decisions based on evaluation of an IP data packet within the Ethernet packet.

As shown in FIG. 1, each switch 12 has an associated host CPU 26 and a buffer memory 28, for example an SSRAM. The host CPU 26 controls the overall operations of the corresponding switch 12, including programming of the switch fabric 25. The buffer memory 28 is used by the corresponding switch 12 to store data frames while the switch fabric 25 is processing forwarding decisions for the received data packets.

As described above, the switch fabric 25 is configured for performing layer 2 switching decisions and layer 3 switching decisions. The availability of layer 3 switching decisions may be particularly effective if an end station 14 within subnetwork 18a wishes to send an e-mail message to selected network stations in subnetwork 18b, 18c, or both; if only layer 2 switching decisions were available, then the switch fabric 25 of switch 12a would send the e-mail message to switches 12b and 12c without specific destination address information, causing switches 12b and 12c to flood all their ports. Otherwise, the switch fabric 25 of switch 12a would need to send the e-mail message to a router (not shown), which would introduce additional delay. Use of layer 3 switching decisions by the switch fabric 25 enables the switch fabric 25 to make intelligent decisions as far as how to handle a packet, including advanced forwarding decisions, and whether a packet should be considered a high-priority packet for latency-sensitive applications, such as video or voice. Use of layer 3 switching decisions by the switch fabric 25 also enables the host CPU 26 of switch 12a to remotely program another switch, for example switch 12b, by sending a message having an IP address corresponding to the IP address of the switch 12b; the switch 12b, in response to detecting a message addressed to the switch 12b, can forward the message to the corresponding host CPU 26 for programming of the switch 12b.

Figure 2:
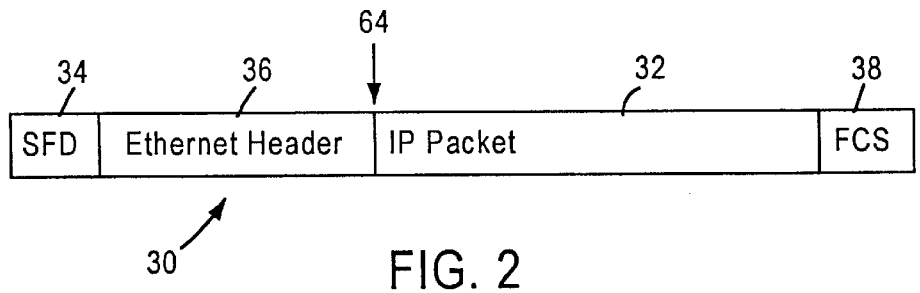
FIG. 2 is a diagram illustrating a conventional layer 2 Ethernet-type data packet carrying a layer 3 Internet protocol (IP) packet.

FIG. 2 is a diagram illustrating an Ethernet (IEEE 802.3) packet 30 carrying an IP packet 32 as payload data. Specifically, the Ethernet packet 30 includes a start frame delimiter (SFD) 34, an Ethernet header 36, the IP packet 32, and a cyclic redundancy check (CRC) or frame check sequence (FCS) field 38. Hence, a switch fabric 25 configured for layer 3 switching decisions needs to be able to quickly process the IP packet 32 within the received Ethernet frame 30 to avoid blocking of the frame within the switch.

Figure 3:
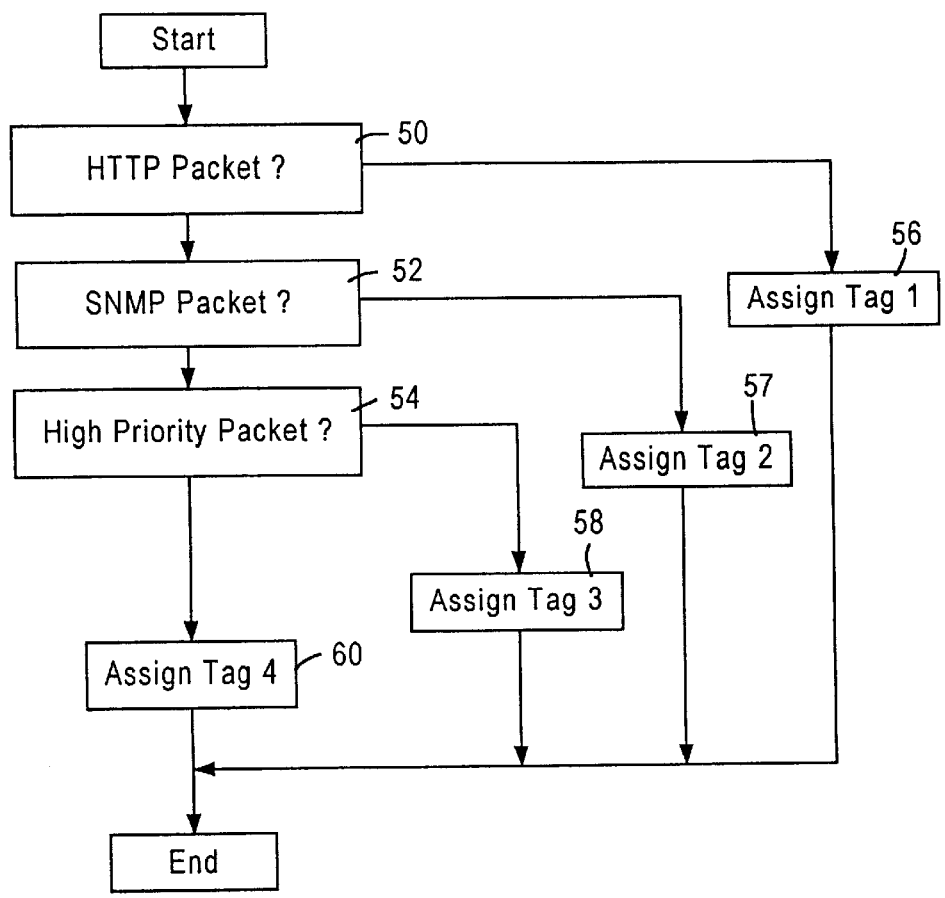
FIG. 3 is a flow diagram illustrating a conventional (prior art) method of evaluating an IP packet.

FIG. 3 is a flow diagram illustrating an example of the type of layer 3 processing that might be performed for an incoming data packet. The flow diagram of FIG. 3, conventionally implemented in software, would involve checking whether the incoming data packet was a hypertext transport protocol (HTTP) packet in step 50, an SNMP packet in step 52, or a high-priority packet in step 54. The appropriate tag would then be assigned identifying the packet in steps 56, 58, or 60.

The arrangement of FIG. 3, however, cannot from a practical standpoint be implemented in hardware in a manner that would provide a non-blocking switch for 100 Mbps or gigabit networks. In particular, the sequential nature of the decision process in FIG. 3 would result in undue latency for the incoming data packet.

According to the disclosed embodiment, the packet classifier module 24 of FIG. 1 is configured for multiple simultaneous comparisons between the incoming data stream and templates that identify the data format of the incoming data stream. Specifically, users of the host processor 26 will specify policies that define how data packets having certain IP protocols should be handled by the switch fabric 25. These policies are implemented by loading into the switch fabric 25 a set of frame forwarding decisions for each corresponding IP protocol type. Hence, the switch fabric 25 could include one set of frame forwarding instructions for an HTTP packet, another set of frame forwarding instructions for an SNMP packet, and another set of frame forwarding instructions for a high-priority packet (e.g., video, or voice, etc.).

Figure 4:
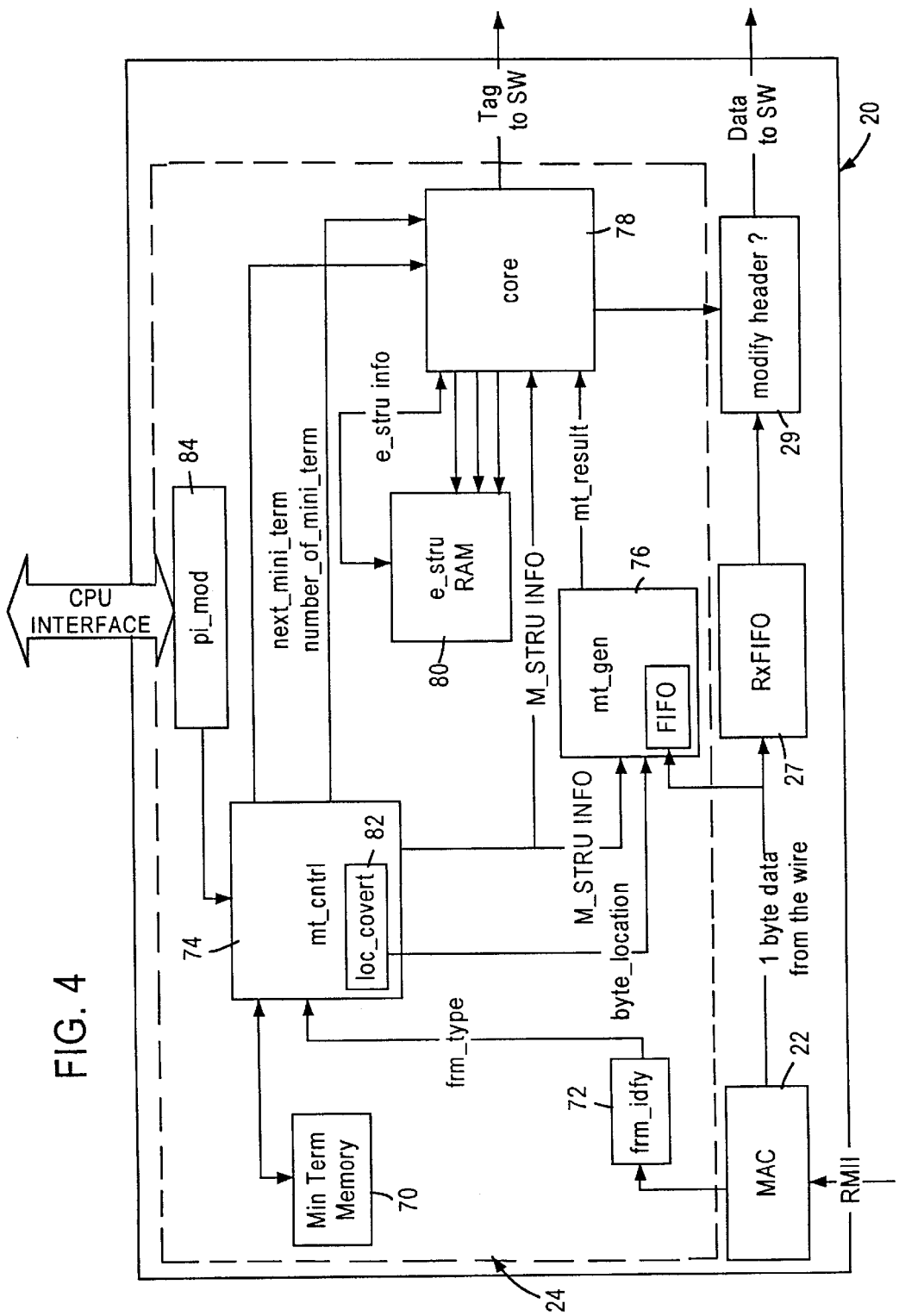
FIG. 4 is a block diagram illustrating the network switch port of FIG. 1, including the network switch port filter, according to an embodiment of the present invention.

FIG. 4 is a block diagram illustrating the packet classifier module 24 according to an embodiment of the present invention. As shown in FIG. 4, the network switch port 20 includes a MAC 22, a receive FIFO buffer 27, a header modifier 29, and the packet classifier module 24. The packet classifier module 24, also referred to as a network switch port filter, is configured for identifying (i.e., evaluating) the incoming data packet at the network switch port 20, and supplying to the switch fabric 25 a tag that specifies the action to be performed on the data packet based on type of data packet being received. Specifically, the packet classifier module 24 simultaneously compares the incoming data packet with a plurality of templates configured for identifying respective data formats. The packet classifier module 24, based on the comparison between the incoming data packet and the plurality of templates, identifies an equation to be executed that specifies the tag to be supplied to the switch fabric 25.

Specifically, the packet classifier module 24 generates a comparison result that identifies the incoming data packet by detecting at least one matched template from a plurality of templates. The packet classifier module 24 then identifies which of the equations includes the matched template, and generates the tag specified by the equation.

Figure 5A:
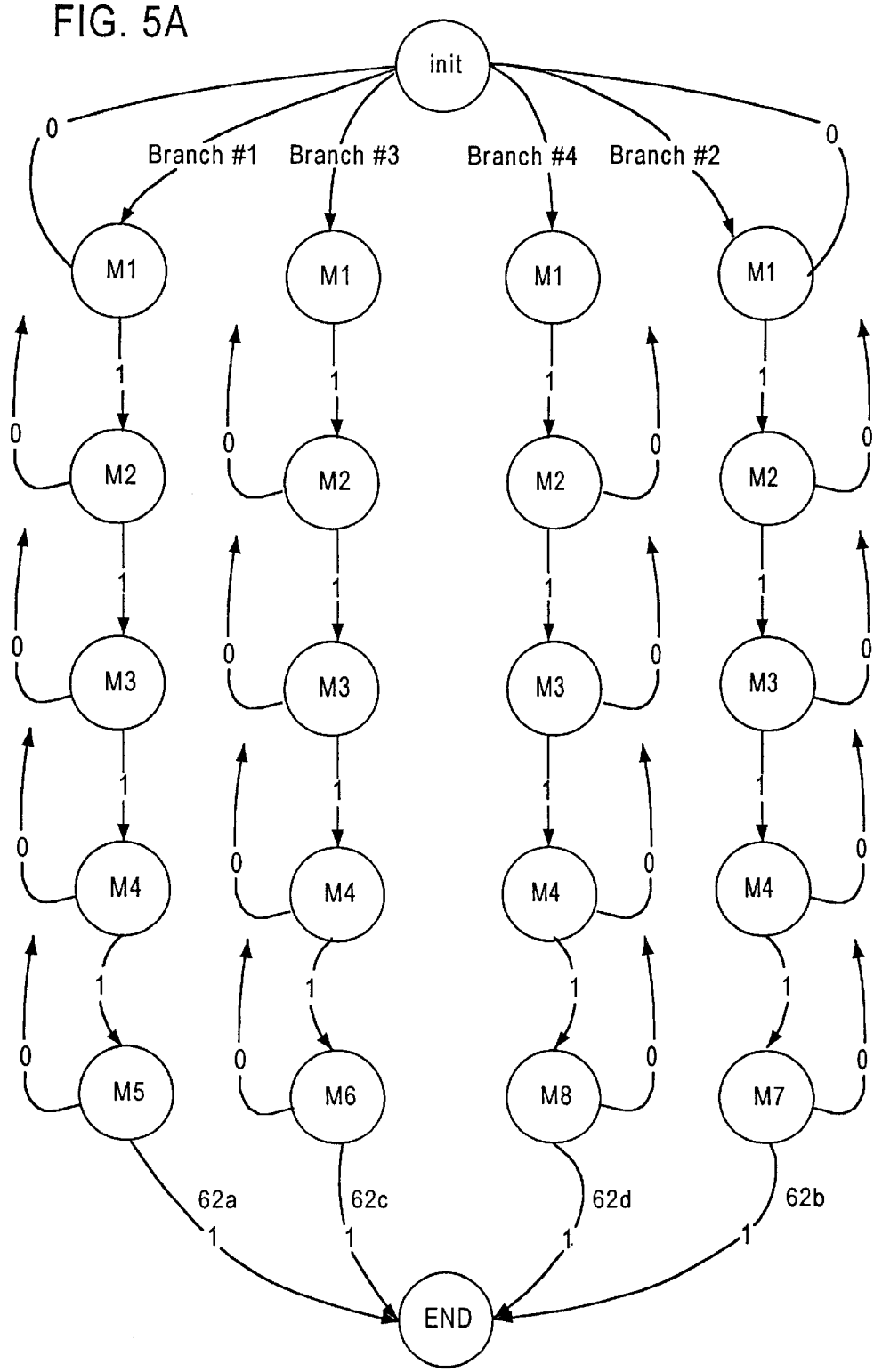
FIGS. 5A and 5B are diagrams illustrating simultaneous processing of two templates of an equation by the min term generator of FIG. 4.
Figure 5B:
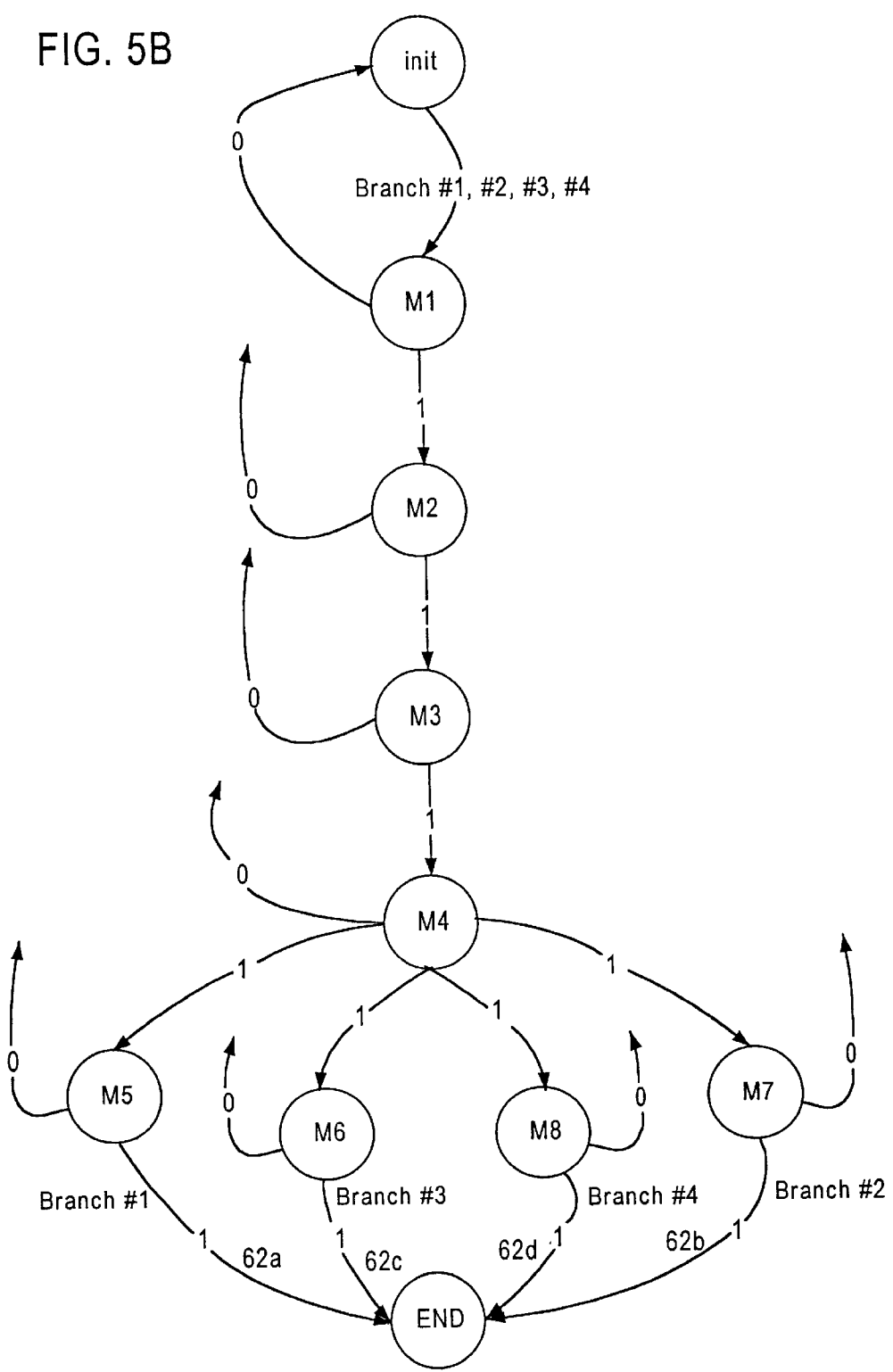

FIGS. 5A and 5B are diagrams illustrating the simultaneous processing of two templates of an equation by the packet classifier module 24. FIG. 5A illustrates the logical evaluation by the packet classifier module 24 of the equation:

$$Eq1=M1*M2*M3*M4*(M5+M6+M7+M8).$$

FIG. 5B illustrates how the equation Eq1 would actually be stored in the min term memory 70. The equation Eq1 includes four templates 62a, 62b, 62c, and 62d: the template 62a includes the min terms M1, M2, M3, M4, and M5; the template 62b includes the min terms M1, M2, M3, M4, and M6; the template 62c includes the min terms M1, M2, M3, M4, and M7; and the template 62d includes the min terms M1, M2, M3, M4, and M8. Each template 62 corresponds to a specific IP data format recognizable based on the header of the IP data packet 32. For example, templates 62a and 62c may be configured for identifying an HTRP packet, and templates 62b and 62d be may be configured for identifying an SNMP packet. Specifically, an HTTP packet is identified if it is in IPv4 format, the time to live field in IP is bigger than one, the protocol field in IP header is TCP, header checksum is correct, source TCP port is 80 or destination TCP port is 80. An SNMP packet is identified if it is in IPv4 format, the time to live field in IP is bigger than one, the protocol field in IP header is TCP, header checksum is correct, source TCP port is 25 or destination TCP port is 25.

Hence, the following min terms may be established to represent all the above-described criteria:

M1=packet is in IPv4 format
M2=time to live field in IP is bigger than one
M3=protocol field in IP header is TCP
M4=header checksum is correct
M5=source TCP port is 80
M6=destination TCP port is 80
M7=source TCP port is 25
M8=destination TCP port is 25

Hence, the templates 62a and 62c identify HTTP packets, and the templates 62b and 62d identify SNMP packets. Thus, equation one (Eq1) specifies that a specific result (e.g., the tag having a specified value) should be output to the switch fabric 25 if either template 62a, 62b, 62c, or 62d are true.

Figure 6:
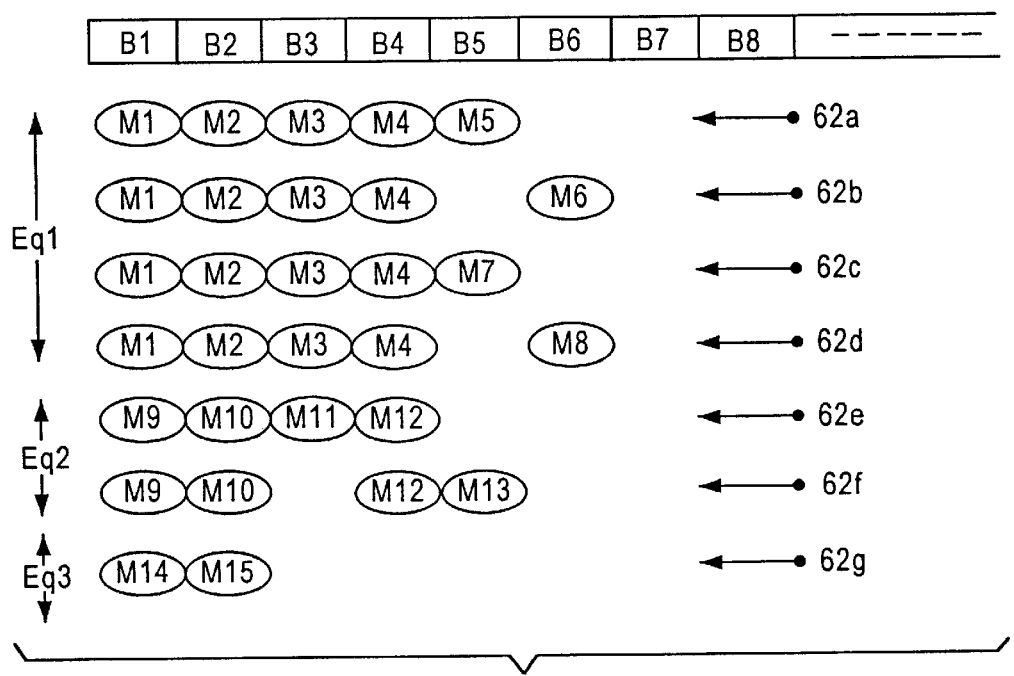
FIG. 6 is a diagram illustrating in further detail the simultaneous processing of min terms by the min term generator of FIG. 4.

Moreover, the min terms M1 . . . M8 are arranged within the associated templates 62a and/or 62b in a prescribed order that corresponds to the relative position of a data byte in the incoming data stream. As illustrated in FIG. 6, the min term M1 is configured for comparison with the first byte (B1) of the IP packet 32, the min term M2 is configured for comparison with a subsequent byte (B2) of the IP packet 32 that follows B1, the min term M3 is configured for comparison with a subsequent byte (B3) that follows B2, etc. Hence, the use of templates 62 having min terms in an order based on the relative position of a data byte in the incoming data stream enables multiple simultaneous comparisons between the incoming data stream and min terms. Hence, an incoming data packet can be compared to multiple templates to determine not only the data format of the incoming data packet, but also what action needs to be performed by the switch fabric 25.

Figure 7:
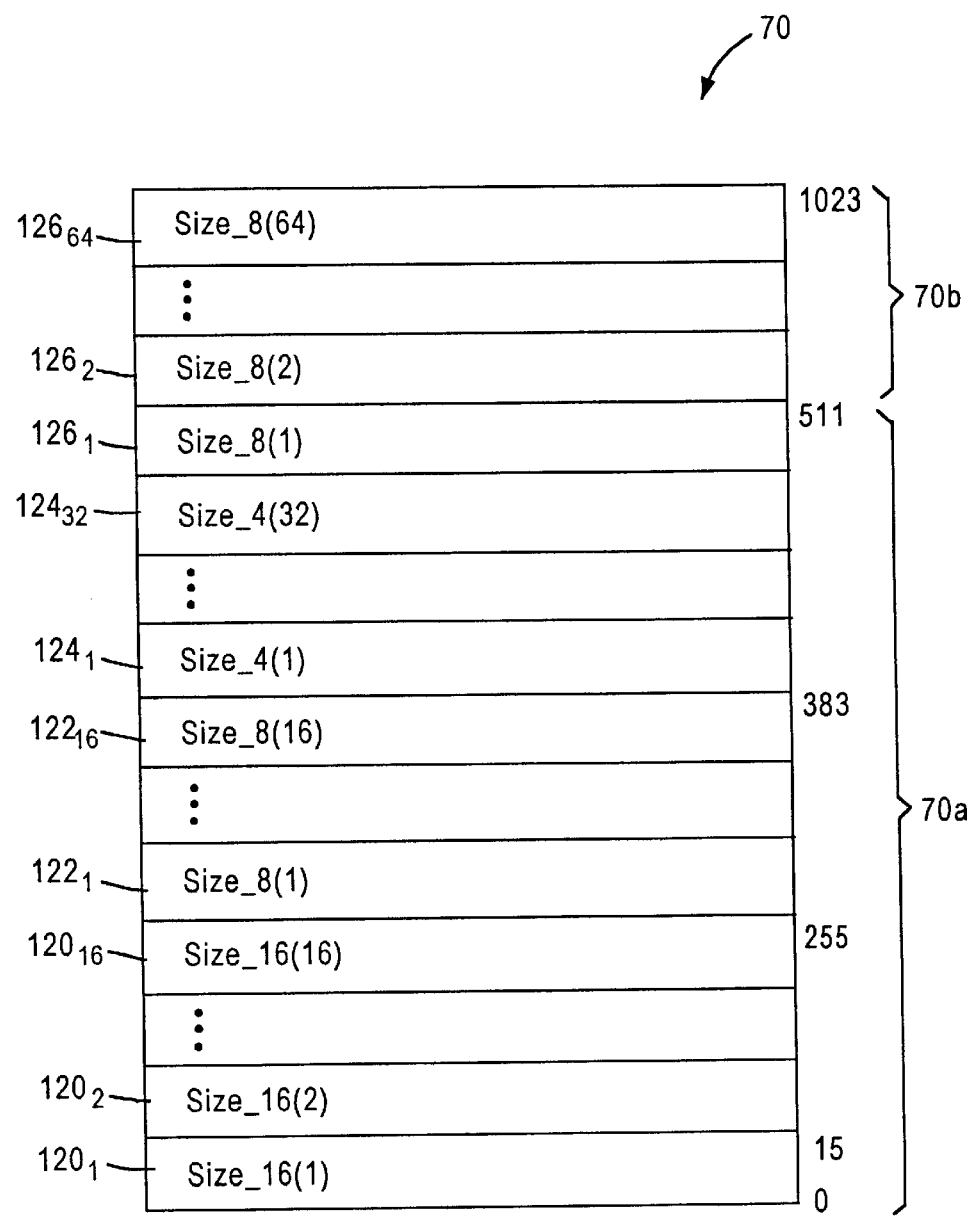
FIG. 7 is a diagram illustrating the structure of the min term memory of FIG. 4 according to an embodiment of the present invention.

FIG. 4 is a block diagram illustrating in detail the packet classifier 24 of FIG. 1. As shown in FIG. 4, the packet classifier 24, also referred to as a network switch port filter, includes a min term memory 70 for storing the min term values (e.g., M1, M2, etc.) as illustrated in FIG. 7, described below. The packet classifier 24 also includes a frame identifier 72 configured for identifying the type of layer 2 frame being received; in particular, identifying the type of layer 2 frame being received (e.g., Ethernet, IEEE 802 to 3, etc.) enables identification of the start position 64 of the IP packet 32 within the layer 2 packet 30. The packet classifier 24 also includes a min term controller 74, a min term generator 76, an equation core 78, and an evaluation results memory 80. A processor interface module (pi_mod) 82 is used for transferring the generated min terms from the host CPU 26 into the min term memory 70. The min term controller 74 is configured for storing the min terms, described below, in the min term memory 70 as they are supplied from the host processor 26 via the processor interface 84. The min term controller 74 is also configured for fetching the min terms from the min term memory 70 corresponding to a selected byte of the IP frame 32. The min term controller 74 also includes a location converter configured for specifying the actual byte location (byte_location) of the start point 64 in response to receiving a frame type (frm_type) signal from the frame identifier 72 that specifies the type of layer 2 frame. Hence, the min term controller 74, in response to detecting the beginning of the IP packet, fetches all the min terms that are to be compared with the first byte (B1) of the IP packet 32, for example min terms M1, M9, and M14 for equations Eq1, Eq2, and Eq3 in FIG. 6. The min term controller 74 then forwards the min term values (M_STRU INFO) to the min term generator 76 and the equation core 78.

The min term generator 76 performs the actual min term comparisons between the min terms fetched by the min term controller and the selected byte of the incoming data stream. For example, the min term generator 76 simultaneously compares in FIG. 6 the incoming data byte B1 with the min terms M1, M9, and M14, and provides the min term comparison results (mt_result) to the equation core 78. During the next comparison cycle, the min term generator 76 simultaneously compares the incoming data byte B2 with the min terms M2, M10, and M15. According to the disclosed embodiment, the min term generator is configured for simultaneously comparing the incoming data stream to up to eight min terms.

The equation core 78 is configured for generating a frame tag based on the min term comparison results received from the min term generator 76, relative to the relevant templates 62. For example, the equation core 78 evaluates equation 1, illustrated in FIG. 5, by evaluating the min term results sequentially as the results are supplied from the min term generator. For example, if the comparisons for each of the min terms M1, M2, M3, M4, M5, and M6 result in a true condition, described below with respect to FIGS. 9A and 9B, then the end condition is matched in equation 1, causing the equation core 78 to generate a tag corresponding to the condition specified for equation 1. The frame tag identifies the incoming data packet, as well as the action that needs to be performed by the switch fabric 25.

Figure 8A:
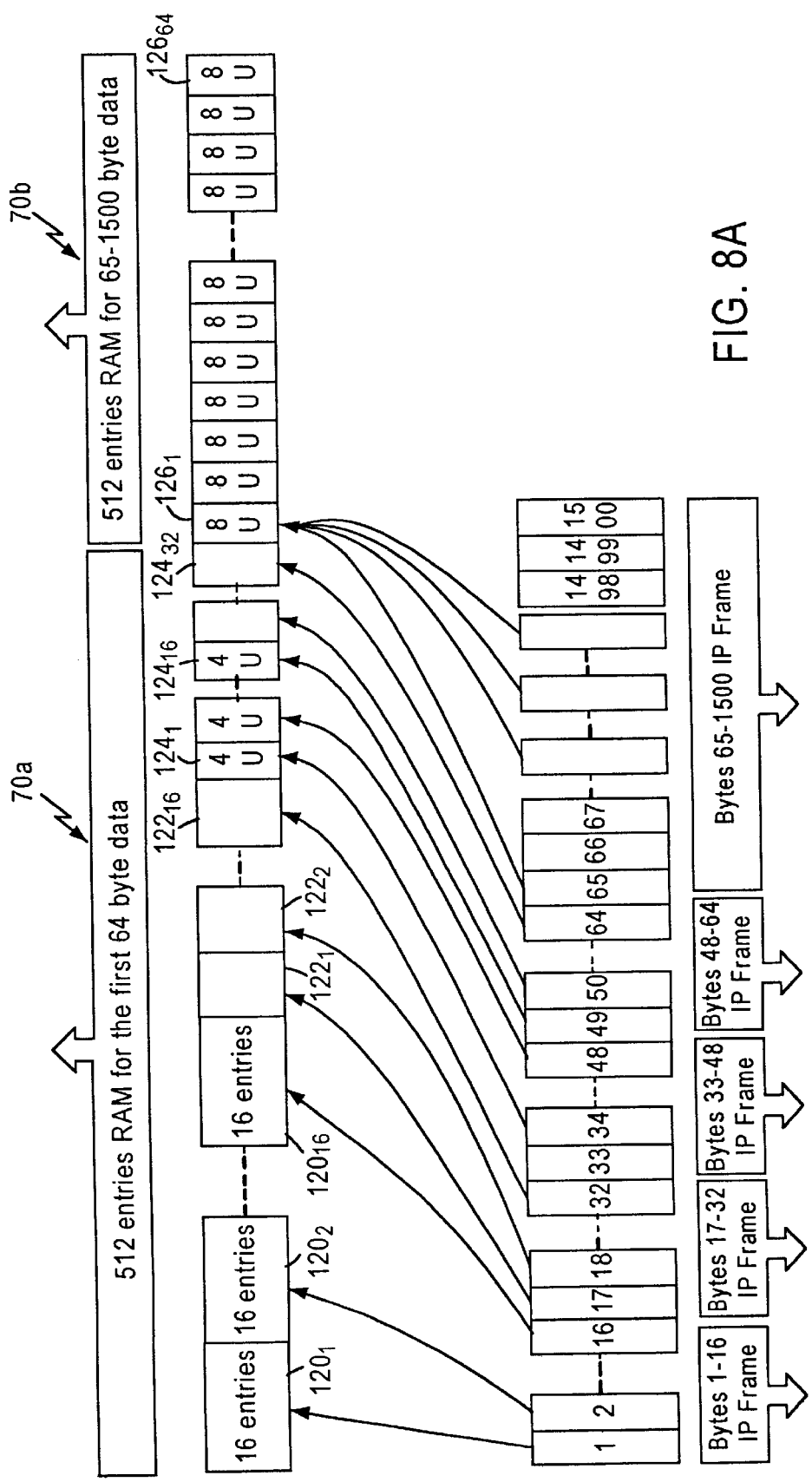
FIGS. 8A and 8B are diagrams illustrating arrangements for ordering min terms in the min term memory according to first and second embodiments of the present invention.
Figure 8B:
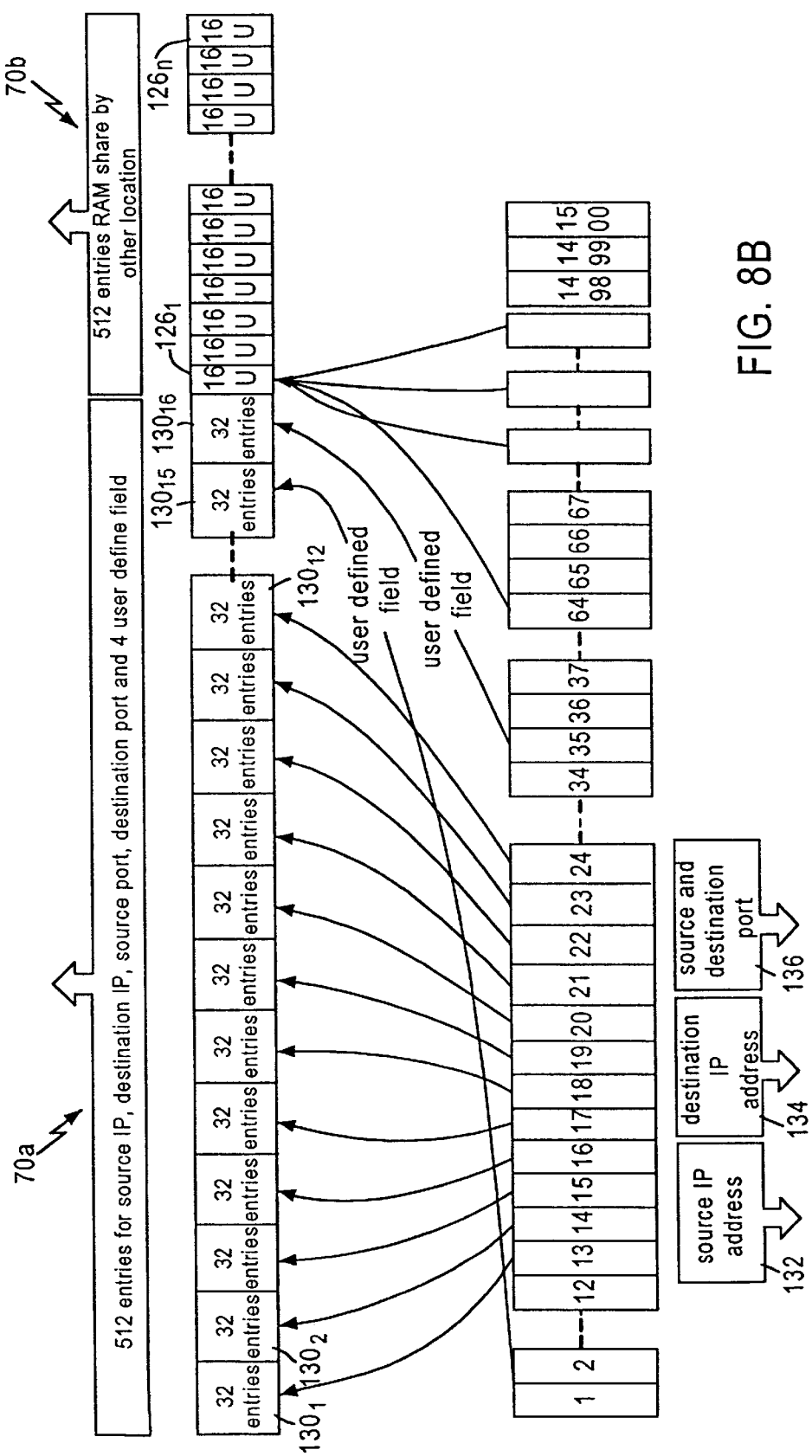
Figure 9A:
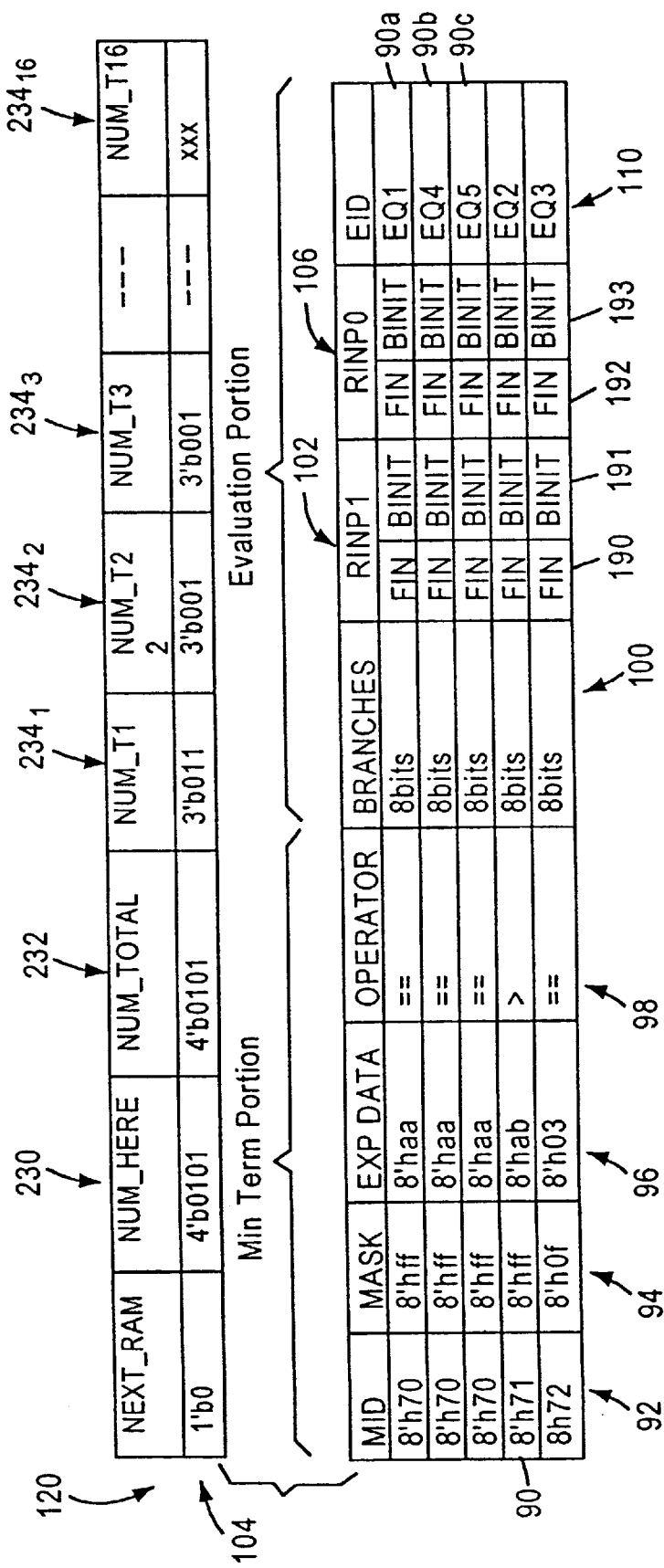
FIGS. 9A and 9B are diagrams illustrating table entries of min terms in the lower and upper portions of the min term memory of FIG. 7 according to an embodiment of the present invention.
Figure 9B:
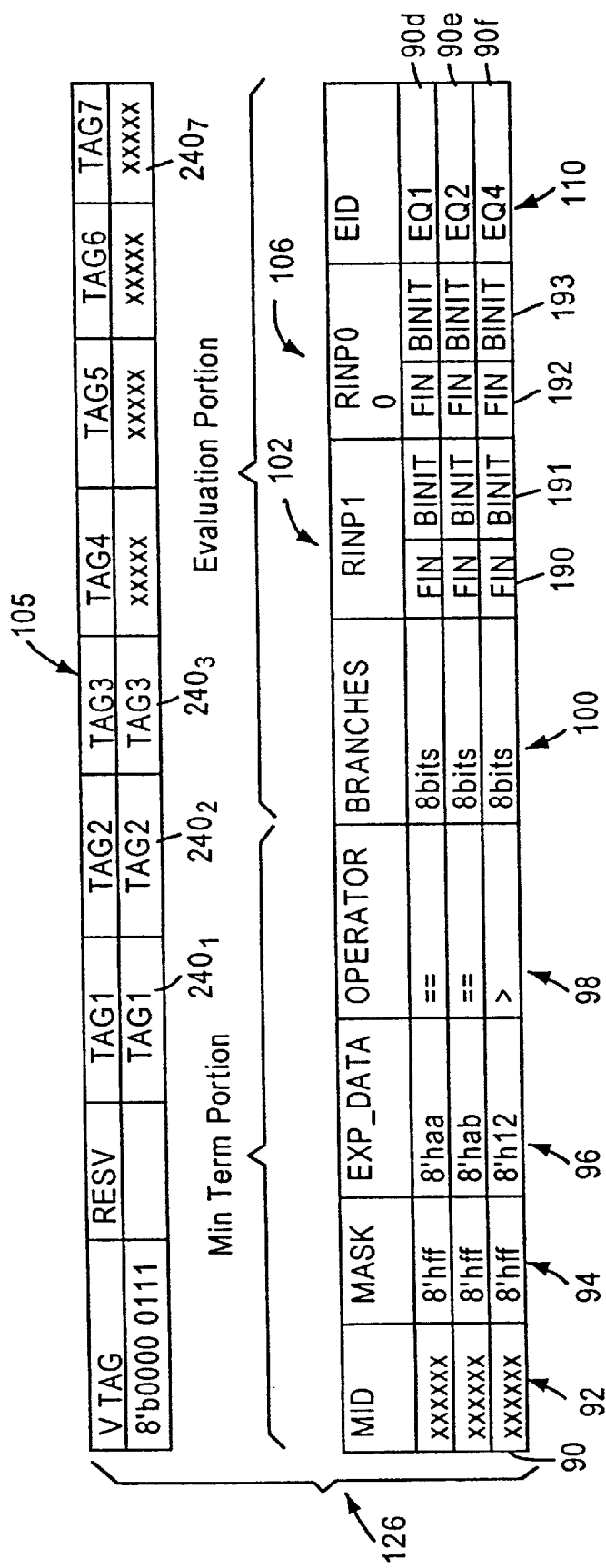

FIGS. 9A and 9B are diagrams illustrating the data format of the min term structure in the lower and upper portions of the min term memory 70, respectively. As described above, the min terms are stored in the min term memory 70 in memory blocks 120, 122, 124, or 126. The memory blocks are allocated a corresponding size, described below, and are arranged in an order based on the relevance of a given data byte to evaluation of the incoming data packet. The order may be based strictly on the order in which the data byte is received, as illustrated in FIG. 8A, or alternately may be based on the evaluation of selected fields within the IP frame, for example source IP address, destination IP address, source port, destination port, in the order in which the selected fields are received, as illustrated in FIG. 8B. Hence, all min terms that are to be compared to the first data byte are stored together in a first part of the min term memory, followed by min terms to be compared with the second data byte, etc. For example, FIG. 9A illustrates that the min term entries 90 in the illustrated memory block 120 store the min terms for the seventh byte of the IP header, as indicated by the hexadecimal address "7X" in the MID field 92.

Each table entry 90 includes a min term portion and an evaluation portion. The min term portion includes a min term identifier field (MID) 92, a mask field (MASK) 94, an expected data field (EXP_DATA) 96, and an operator field (OPERATOR) 98. The min term identifier field 92 identifies the min term based on the data byte to be compared, and the values of the mask field 94, the expected data field 96, and the operator field 98; as described below, multiple min terms may have the same min term identifier field 92 if the min terms are associated with different equations. The mask field 94 is a mask that is used by the min term generator 76 in performing comparisons; if the mask has a bit set to 1, the value is compared, and if the mask value has zeros in the field, the comparison is a don't care. The expected data field 96 specifies the expected data to be compared with the relevant data byte of the IP packet 32. The operator field 98 specifies the type of comparison to be performed by the min term generator, for example: less than, less than or equal to, equal to, greater than, greater than or equal to, and not equal to.

The evaluation portion includes a branches portion 100, a response portion (RINP1) 102 for the case where the comparison of the min term portion is true, a second response portion (RINP0) 106 for the case where the comparison of the min term portion is false, and an equation identifier 110. The branches portion 100 specifies the order of the OR term in the equation; for example, the min term M1 as shown in FIGS. 5 and 6 would have its branches portion set to 0000 1111, indicating that the first four branches of the equation specified in the equation identifier field 110 are to include the corresponding min term. The use of eight bits for the branches portion assumes that there are a maximum of eight branches in any given equation.

The response portion 102 specifies the operation to be performed if the min term portion is evaluated as true relative to the compared data byte. In particular, the response portion 102 includes a finish bit (FIN) 190 and a back to initial bit (BINIT) 191: the finish bit (FIN) 190 is set to one if the results of the equation is determined if the min term result is true; the back to initial (BINIT) 191 is set to one if the evaluation process should return to the initial state (init) and the corresponding branch should be "killed" (i.e., disregarded) if the min term result is true. For example, in the case of min term M1, the FIN bit 190 and the BINIT 191 bit of RINP1 are set to zero, since additional comparisons are needed if the min term result is true. In the case of min terms M6 and M8, the FIN bit 190 of RINP1 is set to one, since a comparison result of "true" results in the end of the evaluation, as shown in FIG. 5.

The response portion 106 specifies the operation to be performed if the min term portion is evaluated as false relative to the compared data byte. In particular, the finish bit (FIN) 192 of portion 106 is set to one if the results of the equation is determined if the min term result is false; the back to initial (BINIT) 193 of portion 106 is set to one if the evaluation process should return to the initial state (init) and the corresponding branch should be "killed" (i.e., disregarded) if the min term result is false. For example, in the case of min term M1, the FIN bit is set to zero and the BINIT bit of RINP1 is set to one, such that the equation would return to the INIT state if the min term result M1 was false, as shown in FIG. 5.

The equation identifier field 110 identifies the equation (or template if there is only one template in an equation) that the min term corresponds to.

Hence, the equation core 78 determines whether any specified equation has a template 62 that matches the incoming data stream. Based on the multiple simultaneous comparisons of the incoming data stream with the multiple templates 62, the equation core 78 can identify a matching equation, and generate the appropriate tag corresponding to the matched equation to the switching fabric 25. If desired, the core 78 may also output a command to the header modifier 29 to modify the layer 2 header, the layer 3 header, or both, before transferring the data to the switch.

Ordering of Min Terms in Allocated Memory Blocks of the Min Term Memory

FIG. 7 is a diagram illustrating in detail the structure of the min term memory 70 according to an embodiment of the present invention. The min term memory 70, implemented for example as a 1k memory having 1024 entries, is configured to have a lower portion 70a and an upper portion 70b. As shown in FIG. 7, each portion 70a and 70b has a size of 512 entries, however the lower portion 70a is configured for storing the min terms associated with most relevant data bytes to be used in evaluating the IP frame 32, and the upper portion 70b is configured for storing the min terms associated with less relevant data bytes to be used in evaluating the IP frame 32.

Specifically, each portion 70a and 70b is arranged by the min term controller 74 for storage of a plurality of different size memory blocks. For example, FIG. 7 illustrates storage of the min terms according to the structure of FIG. 8A, where the lower portion 70a includes sixteen size-sixteen buffers 120, sixteen size-eight buffers 122, and thirty-two size-four buffers 124; the upper portion 70b includes sixty-four size-eight buffers 126. As described below with respect to FIG. 8B, the memory 70 may also be configured by the min term controller 74 to store sixteen size-32 buffers 130 in the lower portion 70a.

FIGS. 8A and 8B are diagrams illustrating the ordering of min terms in the min term memory 70 by the min term controller 74 based on two different examples of relevance to an evaluation of the incoming data packet. As shown in FIG. 8A, the min term controller 74 prioritizes the min terms in an order directly corresponding to the order in which the IP data bytes are received relative to the start location 64. Hence, the min terms associated with byte 1 of the IP frame 32 are stored in memory block $120_1$, the min terms associated with byte 2 of the IP frame 32 are stored in memory block $120_2$, up through byte 16, where the min terms for byte 16 are stored in memory block $120_{16}$. The min terms associated with bytes 17–32 of the IP frame 32 are stored in memory blocks $122_1$ through $122_{16}$, respectively. The min terms associated with bytes 33–64 of the IP frame 32 are stored in memory blocks $124_1$ through $124_{32}$, respectively.

Note that each of the memory blocks 120 are configured for storing sixteen entries, namely fifteen min term entries 90 and a single header field 104, illustrated in FIGS. 9A and 9B. Each memory block 122, however is configured for storing eight entries, namely 7 min term entries 90 and a single header field 104; each memory block 124 is configured for storing for entries, namely 3 min term entries 90 and a single header field 104. Each of the memory blocks 126 of the upper portion 70b is configured for storing eight entries, namely 7 min term entries 90 and a single header field 105.

As illustrated in FIG. 8A, the min terms are stored in the lower portion 70a in a manner where the largest amount of memory space is dedicated by the min term controller 74 to storage of the min terms configured for comparing the earliest data bytes of the IP frame 32; hence, FIG. 8A illustrates that the min term controller 74 prioritizes the storage of min terms in the min term memory 70 based on the order in which the associated data byte is received. This arrangement is beneficial because the beginning of the IP frame usually contains more information relevant to Layer 3 switching decisions, and therefore of interest to the user. Hence, more memory is allocated to store the min terms associated with the beginning of the IP frame.

FIG. 8B illustrates an alternate ordering by the min term controller 74, where the memory blocks are ordered for storage of the min terms based on the relevance in evaluating the incoming IP packet 32. Specifically, a user programming the port filter 24 using the host CPU 26 may be more interested in monitoring the source IP address 132, destination IP address 134, and TCP/UDP source port and TCP/UDP destination port 136 in the IP frame, as opposed to strictly monitoring nonrelevant data bytes that may be present at the beginning of the IP frame 32. In this case, memory blocks $130_1$, $130_2$, to $130_{12}$ are ordered by the min term controller 74 for storage of min terms based on the relevance in evaluating the incoming data packet, where each memory block is configured by the min term controller 74 to store up to 32 min term values. Hence, FIG. 8B illustrates that memory blocks $130_{13}$ (not shown), $130_{14}$ (not shown), $130_{15}$ and $130_{16}$ can be used for user-defined fields, and the upper portion of memory 70b can be used for shared fields $126_1$–$126_n$. Each of the user-defined fields $130_{13}$–$130_{16}$ may store to 32 min term value and the shared field $126_1$–$126_n$ may store up to 16 min term values.

The min terms associated with bytes 13 through 24, however, which are highly relevant as storing the source IP address, destination IP address, and source and destination ports, can be stored in the memory blocks ordered at the beginning of the memory portion 70a. Hence, the min terms associated with byte 13 are stored by the min term controller 74 in memory block $130_1$, the min terms associated with byte 14 are stored in memory block $130_2$, etc., up to the min terms associated with byte 24, which are stored in memory block $130_{12}$. However, in the event that a group of min terms associated with a byte location exceeds the capacity of one of the memory blocks $130_1$–$130_{12}$, the extra or excess group of min terms may be stored in one of the user-defined fields $130_{13}$–$130_{16}$. In the event that the excess group of min terms associated with a byte location exceeds the capacity of both a memory block in memory 70a and one of the user-defined blocks $130_{13}$–$130_{16}$, the second group of extra or excess min terms may be stored by the min term controller 74 in one of the shared block locations $126_1$–$126_n$. Of course, min terms associated with data byte locations other than the destination IP, source IP, source port, destination port, or the user-defined fields are stored by the min term controller 74 in the upper portion 70b within the memory blocks $126_1$–$126_n$.

Other memory configurations may also be applied by the min term controller 74. For example, the entire memory 70 may be configured to have up to twenty one size_48 memory blocks and at least one size_16 (or two size_8, etc.) memory blocks for even more memory space allocation for the memory blocks 130 of FIG. 8B.

Figure 10:
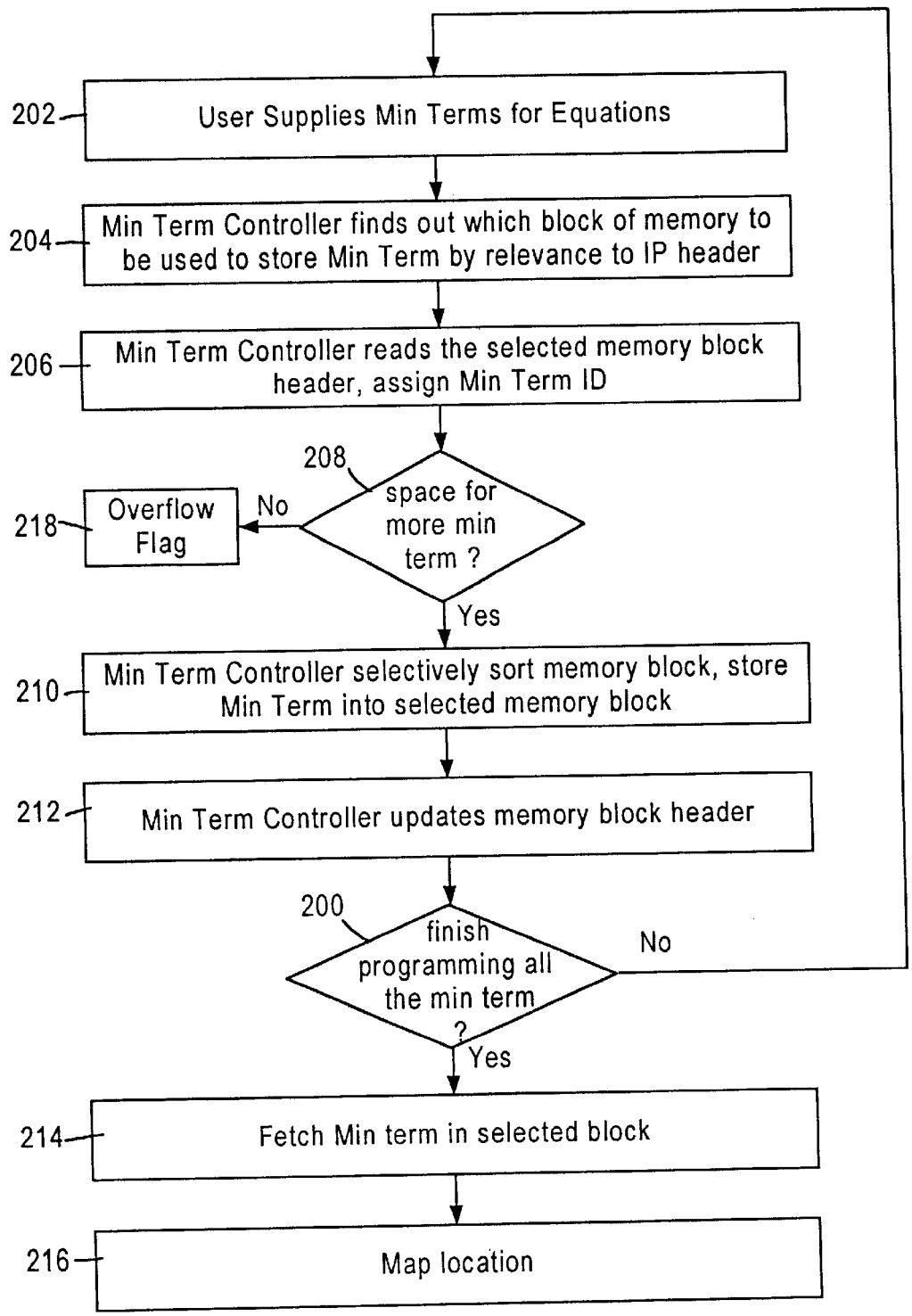
FIG. 10 is a flow diagram illustrating a method for loading the min term memory and supplying the min terms for comparison according to an embodiment of the present invention.

FIG. 10 is a flow diagram summarizing the method of storing min terms by the min term controller 74 into the min term memory 70 according to an embodiment of the present invention. The method begins in step 200, where a user supplies min terms for equations to be used by the core module 78 in evaluating the IP packet 32. For example, assume a user wants to program the port filter 24 with the following equations:

EQ1=byte(7)==8'haa*

EQ2=byte(7)>8'hab*

EQ3=byte(7) 8'hx3*

EQ4=byte(7)==8'haa*

EQ5=byte(7) 8'haa*

The user supplies the min terms for equations 1–5 to the min term controller 74 in step 202, and the min term controller 74 finds out which block of memory needs to be used to store the min terms by relevance to the IP header in step 204, in accordance with either FIG. 8A or FIG. 8B. Only the min terms associated with byte 7 of the IP packet are described here for convenience.

The min term controller 74 reads the selected memory block header, and assigns the min term ID 92 in step 206. The min term controller 74 then checks if there is space for another min term in step 208; if there is no more space for another min term, and overflow flag is set in step 218 to notify the CPU 26. The min term controller 74 then selectively sorts the min terms within the memory block, and stores the min term into the selected memory block in step 210. The min term controller then updates the memory block header 104 in step 212.

The identical min term number fields 234 are used to identify any duplicate min terms that belong to other equations. In other words, the min term controller 74, as it assigns more min terms in step 206, determines whether any min terms are duplicates for different equations; if the min term controller 74 determines that there are duplicate min terms, the duplicate min terms are pushed to the top of the block, and the corresponding identical min term number field 234 is updated. For example, FIG. 9A illustrates that the identical min terms 90a, 90b, and 90c are pushed to the top of the block, and the corresponding identical min term number field (NUM_T1) $234_1$ is updated to enable the min term controller 74 to specify to the core 78 that the identical min term is used in three separate equations EQ1, EQ4, and EQ5. Hence, the min term generator 76 needs to only perform one min term comparison, where the results of the comparison is used in three separate equations by the core 78.

After the user has programmed all the min terms in step 200, indicated by one register, the min term controller 74 fetches the min terms by accessing each memory block in sequence in step 214, and maps in step 216 the actual data byte location based on the location of the corresponding block in the min term memory 70. The determined location is then supplied to the min term generator 76 and the core 78.

Storage of min terms in the upper portion 70b is identical, except that the header 105 is modified to include a tag field 240 to specify which location in the IP sequence the corresponding min term should be associated with. Specifically, the tag fields $240_1$, $240_2$, and $240_3$ are set by the min term controller 74 to specify the byte location for entries 90d, 90e, and 90f, respectively. As shown in FIG. 8A, the first memory block $126_1$ of the upper portion 70b stores the min terms for byte 65 of the IP frame; since each block 126 is configured for storing the min terms for up to 32 different byte positions of the IP frame, the tag field 240 and the upper RAM block number specifies the byte position that the min term monitors. Hence, the IP byte position can be identified as:

IP Byte Position=64*(Tag)+Upper RAM Block Number.

Hence, an Upper RAM Block Number=1 (for block $126_1$) and a Tag value of 0 (for field 240) accesses the $65^{th}$ IP data byte.

According to the disclosed embodiment, a network switch port includes a filter capable of performing multiple simultaneous comparisons between the incoming data stream of the data packet and multiple templates configured for identifying a corresponding protocol. Since the packet classifier module 24 can process anywhere in the packet, the packet classifier module 24 can interpret all the header information in the IP packet 32 from layer 3 up to layers 7 protocols. Moreover, the multiple simultaneous comparisons enables the network switch 12 to perform layer 3 switching for 100 Mbps and gigabit networks without blocking in the network switch. Finally, the multiple simultaneous comparisons in the order in which the data is received enables real time comparisons to be performed, as opposed to alternative schemes such as programmable logic arrays (PLAs), which would require the entire header to be received before processing can begin.

In addition, the storage of min terms in an order based on the relevance to evaluation of the incoming data packet ensures that the incoming data packet can be evaluated in real time, since the min terms are stored, and subsequently fetched, in order based on the relevance to the comparisons in the order in which the data byte is received. Hence, efforts by the min term controller in fetching the appropriate min terms is minimized, since the min term controller can access each memory block in sequence to obtain the necessary min terms for real time comparisons relative to the incoming data packet. Finally, the storage of the min terms in the order based on the relevance optimizes storage in the memory, where the most relevant min terms are accommodated the largest amount of memory space, and relatively nonrelevant min terms are limited to a relatively small portion of the min term memory.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of storing min terms to be used in evaluating an incoming data packet at a network switch port, the method comprising:

receiving from a host controller a plurality of templates configured for simultaneous identification of respective data formats in the incoming data packet, each template having at least one min term configured for comparing a corresponding prescribed value to a corresponding selected byte of the incoming data packet;

allocating memory block sizes in a min term memory based on relevance of respective incoming data bytes of the incoming data packet to evaluation of the incoming data packet; and storing the min terms in the min term memory within the network switch port, including storing a first group of the min terms configured for simultaneous comparison with a corresponding first of the incoming data bytes in a first memory block within the min term memory, and storing a first excess group of the first group of min terms configured for simultaneous comparison with the corresponding first of the incoming data bytes in a user-defined memory block within the min term memory based on to the first group of min terms exceeding a capacity of the first memory block.

2. The method of claim 1, further comprising:

storing a second excess group of the first group of min terms configured for simultaneous comparison with the corresponding first of the incoming data bytes in a shared memory block within the min term memory in response to the first excess group exceeding a capacity of the user-defined memory block.

3. The method of claim 1, wherein the allocating step includes allocating a maximum prescribed memory block size for the min terms configured for comparing bytes of one of a source IP address, a destination IP address, a source port value, and destination port value of an IP packet within the incoming data packet.

4. The method of claim 2, wherein the writing step includes assigning the first memory block to have a first prescribed number of entries.

5. The method of claim 4, wherein the storing step further includes assigning the userdefined memory block to have a second prescribed number of entries equal to the first prescribed number of entries.

6. The method of claim 4, wherein the writing step further includes a second writing into each of the blocks a header that specifies a number of the stored min terms for comparison with the corresponding byte of the IP packet at the corresponding position.

7. The method of claim 6, wherein the second writing step includes specifying a number of identical min terms that corresponds to unique equations, each equation configured for generating a corresponding unique result for a network switch fabric based on the comparisons of the associated templates.

8. The method of claim 6, wherein the storing step further includes assigning the shared memory block to have a third prescribed number of entries less than the first prescribed number of entries.

9. The method of claim 8, wherein the writing step further includes third writing into each of the blocks a header that specifies a number of the stored min terms for comparison with the corresponding byte of the IP packet at the corresponding position.

10. The method of claim 9, wherein the third writing step includes specifying a number of identical min terms that corresponds to unique equations, each equation configured for generating a corresponding unique result for a network switch fabric based on the comparisons of the associated templates.

11. A network switch port comprising:

a processor interface configured for receiving a plurality of templates configured for simultaneous identification of respective data formats in an incoming data packet, each template having at least one min term configured for comparing a corresponding prescribed value to a corresponding selected byte in the incoming data byte;

a min term memory configured for storing min term values; and a min term controller configured for allocating memory block sizes in the min term memory based on relevance of respective incoming data bytes of the incoming data packet for evaluation of the incoming data packet, and for storing a first group of the min terms configured for simultaneous comparison with a corresponding first of the incoming data bytes in a first memory block within the min term memory, and storing a first excess group of the first group of min terms configured for simultaneous comparison with the corresponding first of the incoming data bytes in a user-defined memory block within the min term memory based on the first group of min terms exceeding a capacity of the first memory block.

12. The network switch port according to claim 11, wherein the min term controller is further configured to store a second excess group of the first group of min terms configured for simultaneous comparison with the corresponding first of the incoming data bytes in a shared memory block within the min term memory in response to the first excess group exceeding a capacity of the user-defined memory block.

13. The network switch port according to claim 11, wherein the min term controller is further configured to allocate a maximum prescribed memory block size for the min terms configured for comparing bytes of one of a source IP address, a destination IP address, a source port value, and destination port value of an IP packet within the incoming data packet.

14. The network switch port according to claim 12, wherein the min term controller is further configured to assign the first memory block to have a first prescribed number of entries.

15. The network switch port according to claim 14, wherein the min term controller is further configured to assign the user-defined memory block to have a second prescribed number of entries equal to the first prescribed number of entries.

16. The network switch port according to claim 15, wherein the min term controller is further configured to a second write into each of the blocks a header that specifies a number of the stored min terms for comparison with the corresponding byte of the IP packet at the corresponding position.

17. The network switch port according to claim 16, wherein the min term controller is further configured to specify a number of identical min terms that corresponds to unique equations, each equation configured for generating a corresponding unique result for a network switch fabric based on the comparisons of the associated templates.

18. The network switch port according to claim 16, wherein the min term controller is further configured to assign the shared memory block to have a third prescribed number of entries less than the first prescribed number of entries.

19. The network switch port according to claim 18, wherein the min term controller is further configured to a third write into each of the blocks a header that specifies a number of the stored min terms for comparison with the corresponding byte of the IP packet at the corresponding position.

20. The network switch port according to claim 19, wherein the min term controller is further configured to specify a number of identical min terms that corresponds to unique equations, each equation configured for generating a corresponding unique result for a network switch fabric based on the comparisons of the associated templates.

* * * * *